March 23, 1954   H. I. PHELPS   2,673,118
RAYLESS VISOR
Filed Aug. 3, 1951

INVENTOR
HELEN IRENE PHELPS

BY Gustave Miller
ATTORNEY

Patented Mar. 23, 1954

2,673,118

UNITED STATES PATENT OFFICE 2,673,118

RAYLESS VISOR

Helen Irene Phelps, Arlington, Va.

Application August 3, 1951, Serial No. 240,159

5 Claims. (Cl. 296—97)

1

This invention relates to a rayless visor and has for an object to provide an improved visor for attachment inside an automobile or other vehicle to extend completely across the upper portion of the windshield of the vehicle and provide full protection from glare or sun rays through such upper portion of the windshield, not only to the driver of the vehicle but also to both or all the passengers that may also be occupying the front seat of the vehicle.

A further object of this invention is to provide a rayless visor which is so pivoted and attached to the inside of the vehicle that it may be moved from a position completely clear of the windshield to a position completely obstructing the upper portion of the windshield for the full width thereof and preventing any rays from entering this portion of the windshield, either in the middle thereof or adjacent the edges thereof as usually happens with the present conventional type of visors which usually are provided in pairs, one adjacent each edge but usually leaving the middle portion and edge portions free thereof so that glare or sun rays may pass therethrough at least to the center passenger if not to both the driver or outside passenger on the vehicle front seat.

A further object of this invention is to provide a full width inside visor for an automobile or other vehicle and additionally to provide auxiliary panels in the main panel of the visor which are pivoted on the main panel so that such auxiliary visors may be independently pivoted up and down when desired in addition to the pivoting of the main panel.

Still a further object of this invention is to provide a full width inside visor for an automobile or other vehicle and to provide auxiliary visors in such full width visor which auxiliary visors may not only be pivoted upwardly as desired but may be pivoted sidewardly to cut off glare from either side.

Still a further object of this invention is to provide a full width visor having auxiliary or small visors pivotally mounted thereon for movement either upwardly or sidewardly or both relative thereto but which may remain flush in the plane of the main visor and means for retaining the auxiliary visors in such flush position in the main visor.

With the foregoing and other objects in view, this invention comprises the combination, construction and arrangement of parts hereinafter set forth, claimed and disclosed in the accompanying drawings, wherein:

Fig. 1 is a plan view of a full width inside

2 visor shown mounted on the inside of an automobile across the top of the windshield.

Figure 1:
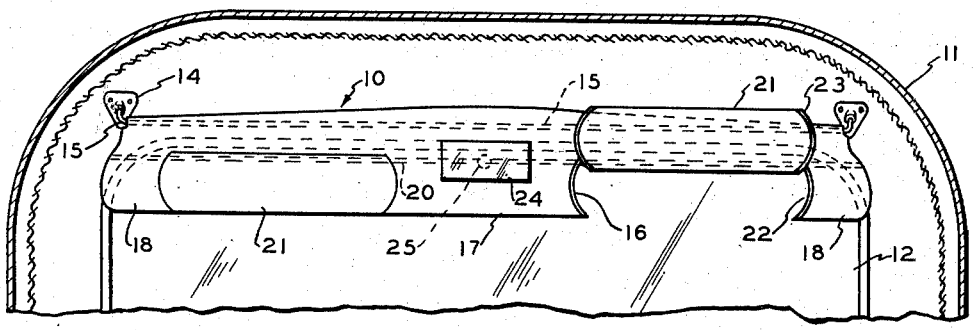

There is shown at 10 one form of the full width visor of this invention mounted on the inside of the body 11 of an automobile and covering the full width of the upper portion of the windshield 12 of the automobile. The full width visor 10 is attached to the inside of the automobile 11 by means of the usual visor brackets 14 between which may extend a hinge rod 15 or any other device for holding same in any position desired and about which the visor 10 is pivoted for movement between the vertical position shown obstructing the upper portion of the windshield 10 and a position adjacent the ceiling of the body of the automobile 11 completely clear of the windshield 12. The visor 10 may be made of any suitable material such as the present fabric material used in conventional inside visors for automobiles or may be made of dark translucent or opaque plastic as desired. The visor 10 is provided with cut-outs 16 extending between a center position 17 of the visor and an edge portion 18 thereof. (A second long rod 20 may extend entirely through the visor 10 across the upper portions of the cut-outs 16 and thus provide a pivoting hinge for small auxiliary visors 21 made of the same material as the main visor 10.) Any other devices may be used to attach auxiliary panels which will allow panels to stay in any position desired. The side edges of the cut-outs and of the small auxiliary visors 21 may each be provided with complementary beveled edges 22 and 23 as shown so that when the small visors 21 are pivoted down they will be flush and in the same plane with the body of the main visor 10 thus providing complete obstruction to the passage of any rays or glare therethrough.

In view of the fact that the usual rear view mirror in the center of the front of the automobile 11 may be hidden by the center portion 17 of the main visor 10 when the visor is in the down position, a supplementary rear view mirror 24 may be provided on the center portion 17 of the visor 10 and may have its conventional universally pivoted mounting means 25 secured on one of the hinging rods through the visor 10, thereby providing a firm base on the visor for the mounting means of the supplementary rear view mirror 24 or may be secured by any other separate pivoting device.

With this form of full width visor, the complete full width visor 10 may be pivoted between an upper position leaving the windshield 12 completely free and a downward position completely covering the full width upper portion of the windshield 12. If the driver finds that too much of the windshield has been covered, he may independently pivot his small auxiliary panel 21 upwardly as far as desired, the hinge rod 20 or other holding device frictionally holding such auxiliary panel in any desired angle. Meantime the remainder of the visor 10 as well as the center portion 17 and end portions 18 prevent unwanted rays from annoying him. This form of this invention is intended particularly as useful complementary to the common type visors which may be left in position in the automobile and used for blocking off glare from the side windows of the automobile.

Figure 2:
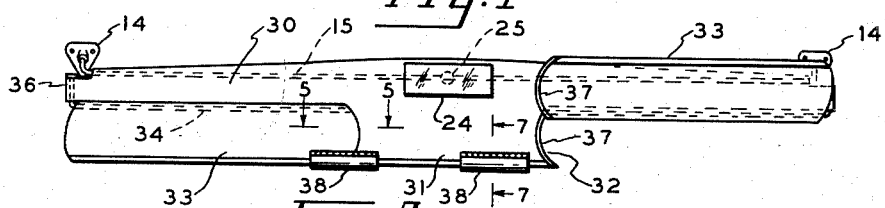
Fig. 2 is a plan view of a slightly modified from of this invention.
Figure 3:
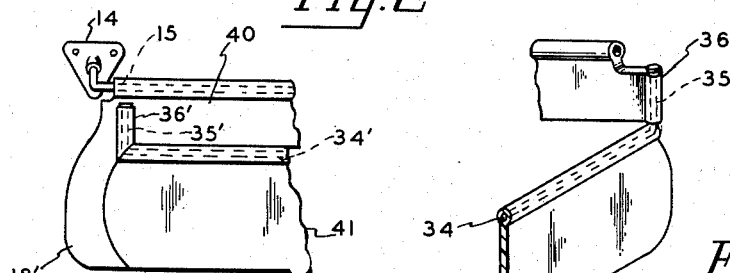
Fig. 3 is a fragmentary plan view on a larger scale of a further modified form of this invention.
Figure 4:
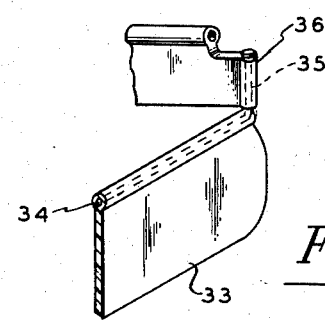
Fig. 4 is a fragmentary view of the right hand end of Fig. 2, with the visor turned to the side window position.
Figure 5:
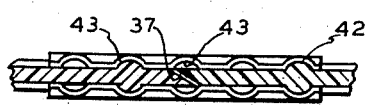
Fig. 5 is a sectional view on line 5—5 of Fig. 2 on a larger scale.
Figure 6:
Fig. 6 is a slightly modified form of Fig. 5.

In Figs. 2 and 3, modified forms of this invention have been shown which eliminate the need for the present conventional type of inside glare visors, as both these modified forms may be used for blocking off glare from side windows when desired. In Fig. 2, the main panel 30 of the visor is shown as pivoted on a long rod 15 extending between brackets 14 the same as in Fig. 1 and has a center portion 31 between cut-outs 32 extending completely to the end of the main panel 30. Auxiliary visors 33 are each hinged for movement in a vertical direction on a rod 34 extending through the upper edge thereof and provided with a right angular end 35 if desired but not necessarily right angular extending upwardly through a socket 36 provided on or formed in the vertical edge of the main panel 30 or any other type of device for holding same in the position desired. As shown in Fig. 2, the auxiliary visor or panel 33 may be pivoted about the rod 34 to an upper position when desired. As shown in Fig. 4, the same auxiliary visor 33 may be turned away from the windshield 12 and toward the window at the side of the car to provide glare protection from rays coming through such side window. In order to provide means for retaining the auxiliary visor 33 flush in the same plane with the main visor 30, the upwardly extending edge of the center panel 31 and similar edge of the auxiliary visor 33 may likewise be provided with complementary bevels as shown at 37 so that when the auxiliary visor 33 is in the down position as shown at the left hand of Fig. 2, there is no possibility of any light rays passing therethrough at these edges. In the same plane, the lower portion of the main panel and adjacent lower edge of the auxiliary panel may be beaded and provided with a resilient U-shaped clamp 38, Fig. 7, having upwardly extending lips 40 for retaining it over the beaded portion 41. This clamp 38 may slide along this beaded edge 41 from a position on the center portion 31 to a position extending over the meeting edges of the auxiliary panel and of the main panel thus locking the auxiliary panel against movement relative to the main panel. To assist in holding the clamp 38 in any set position, the lip 40 may be provided with a series of recesses 42 complementary to bosses 43 so as to permit intentional but prevent accidental movement of the clamps 38.

In Fig. 3, there is shown a slightly further modified form wherein the full width visor 40 is pivoted on rod 15 between brackets 14 and provided with an auxiliary visor 41 pivoted on a rod 34' having an end 35' at right angles thereto through a socket 36' formed in or provided on the main panel of the visor 40. In this form the cut-out does not extend clear to the edge as in Fig. 2 but stops short thereof similar to that in Fig. 1 and thus has an edge portion 18' in addition to a center portion. The auxiliary panel 41 may be moved either vertically upwardly or about its vertical pivot sidewardly to cover and prevent glare from the side window of the automobile just as is possible with the form in Fig. 2.

Figures 7, 8:
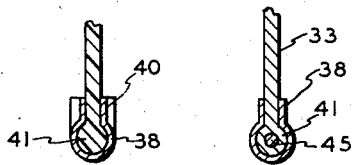
Fig. 7 is a sectional view on line 7—7 of Fig. 2.
Fig. 8 is a sectional view on line 8—8 of Fig. 6.
Figure 9:
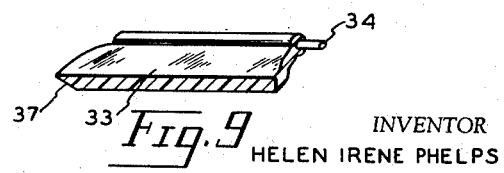
Fig. 9 is a fragmentary view showing a beveled edge on the auxiliary visor.

As shown in Fig. 7, the beaded edge 41 may be formed integrally in the visor when the visor is of a plastic material, while as shown in Fig. 8 a beading wire 45 may be provided when the visor is made of fabric or other material.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A rayless visor adapted for attachment inside an automobile or other vehicle to extend completely across the upper portion of the windshield of the vehicle comprising a main panel of a length at least as great as the length across the top of the windshield, hinge means on said main panel by which to attach the main panel to the inside of the vehicle for pivotal movement between an upper position clear of the windshield and a lower position covering the full width upper portion of the windshield, and an auxiliary panel hingedly mounted on said main panel and extending from adjacent one vertical edge to adjacent the middle portion of said main panel, said main panel having a cut-out along its bottom edge to receive said auxiliary panel and means for tightly hinging said auxiliary panel to said main panel comprising a rod frictionally retained on said auxiliary panel, which will allow the auxiliary panel to remain in any position desired, and extending longitudinally from said main panel through the top edge of said auxiliary panel permitting said auxiliary panel to be hinged upwardly independently of said main panel, the end of said latter rod extending to said main panel being bent upwardly at right angles and a vertically-extending socket on said main panel for receiving the bent up end of said latter rod and permitting said auxiliary panel to hinge away from the vehicle windshield toward a side window of the vehicle.

2. A rayless visor adapted for attachment inside an automobile or other vehicle to extend completely across the upper portion of the windshield of the vehicle comprising a main panel of a length at least as great as the length across the top of the windshield, hinge means on said main panel by which to attach the main panel to the inside of the vehicle for pivotal movement between an upper position clear of the windshield and a lower position covering the full width upper portion of the windshield, an auxiliary panel hingedly mounted on said main panel and extending from adjacent one vertical edge to adjacent the middle portion of said main panel, said main panel having a cut-out along its bottom edge to receive said auxiliary panel and means for hinging said auxiliary panel to said main panel comprising a rod, extending longitudinally along said main panel through the top edge of said auxiliary panel permitting said auxiliary panel to be hinged upwardly independently of said main panel, the end of said latter rod extending to said main panel being bent upwardly at right angles and vertically-extending socket on said main panel pivotally receiving the bent up end of said latter rod permitting said auxiliary panel to hinge away from the vehicle windshield toward a side window of the vehicle, and independent means for retaining said auxiliary panel in the same plane with said main panel.

3. A rayless visor adapted for attachment inside an automobile or other vehicle to extend completely across the upper portion of the windshield of the vehicle comprising a main panel of a length at least as great as the length across the top of the windshield, hinge means on said main panel by which to attach the main panel to the inside of the vehicle for pivotal movement between an upper position clear of the windshield and a lower position covering the full width upper portion of the windshield, an auxiliary panel hingedly mounted on said main panel and extending from adjacent one vertical edge to adjacent the middle portion of said main panel, said main panel having a cut-out along its bottom edge to receive said auxiliary panel and means for hinging said auxiliary panel to said main panel comprising a rod extending longitudinally along said main panel through the top edge of said auxiliary panel permitting said auxiliary panel to be hinged upwardly independently of said main panel, the end of said latter rod extending to said main panel being bent upwardly at right angles, and a vertically-extending socket on said main panel for receiving the bent up end of said latter rod and permitting said auxiliary panel to hinge away from the vehicle windshield toward a side window of the vehicle, and means for retaining said auxiliary panel in the same plane with said main panel comprising complementary meeting beveled edges on said panels.

4. A rayless visor adapted for attachment inside an automobile or other vehicle to extend completely across the upper portion of the windshield of the vehicle comprising a main panel of a length at least as great as the length across the top of the windshield, hinge means on said main panel by which to attach the main panel to the inside of the vehicle for pivotal movement between an upper position clear of the windshield and a lower position covering substantially the full width upper portion of the windshield, an auxiliary panel hingedly mounted on said main panel and extending from adjacent one vertical edge to adjacent the middle portion of said main panel, said main panel having a cut-out along its bottom edge to receive said auxiliary panel, means for hinging said auxiliary panel to said main panel comprising a rod extending longitudinally along said main panel through the top edge of said auxiliary panel permitting said auxiliary panel to be hinged upwardly independently of said main panel, the end of said latter rod extending to said main panel being bent upwardly at right angles, a vertically-extending socket on said main panel for receiving the portion of said rod bent upwardly and permitting said auxiliary panel to hinge away from the vehicle windshield toward a side window of the vehicle, means for retaining said auxiliary panel in the same plane with said main panel comprising a lower beaded aligned edge on the middle portion of said main panel and the adjacent portion of said auxiliary panel, a resilient U-shaped clamp slidable over said beaded edges, an anchor boss on at least one of said panels, and plurality of boss receiving indentions on said clamp for holding said clamp in any desired position.

5. A rayless visor adapted for attachment inside an automobile or other vehicle to extend completely across the upper portion of the windshield of the vehicle comprising a main panel of a length at least as great as the length across the top of the windshield, hinge means on said main panel by which to attach the main panel to the inside of the vehicle for pivotal movement between an upper position clear of the windshield and a lower position covering substantially the full width upper portion of the windshield, said hinged mounting means comprising a long hinge rod extending through said main panel adjacent its upper edge and a bracket at each end for securing said rod to the inside of the vehicle above the windshield, a rear view mirror mounted in the center portion of said main panel, an auxiliary panel hingedly mounted on said main panel and extending from adjacent one vertical edge to adjacent the middle portion of said main panel, said main panel having a cut-out along its bottom edge to receive said auxiliary panel, mans for hinging said auxiliary panel to said main panel comprising a rod extending longitudinally from said main panel through the top edge of said auxiliary panel permitting said auxiliary panel to be hinged upwardly independently of said main panel, the end of said latter rod extending to said main panel being bent upwardly at right angles, a vertically-extending socket on said main panel for receiving the bent up end of said latter rod and permitting said auxiliary panel to hinge away from the vehicle windshield toward a side window of the vehicle, means for retaining said auxiliary panel in the same plane with said main panel comprising complementary meeting beveled edges on said panels, a lower beaded aligned edge on the center portion of said main panel and the adjacent portion of said auxiliary panel, a resilient U-shaped clamp slidable over said beaded edges, an anchor boss on at least one of said panels, and a plurality of boss receiving indentions on said clamp for holding said clamp in any desired position, and a second and similar auxiliary panel, cut-out and mounting means adjacent the other end of said main panel.

HELEN IRENE PHELPS.

References Cited in the file of this patent

UNITED STATES PATENTS

| Number | Name | Date |
|---|---|---|
| 1,600,201 | Reed | Sept. 14, 1926 |
| 1,775,486 | Clements | Sept. 9, 1930 |
| 2,118,198 | Hathaway | May 24, 1938 |
| 2,261,881 | Horstmann | Nov. 4, 1941 |
| 2,458,125 | Winkler | Jan. 4, 1949 |
| 2,548,309 | Hutten | Apr. 10, 1951 |

FOREIGN PATENTS

| Number | Country | Date |
|---|---|---|
| 574,526 | Great Britain | Jan. 9, 1946 |
| 695,895 | France | Dec. 23, 1930 |